(12) United States Patent
Hoshino et al.

(10) Patent No.: US 7,091,705 B2
(45) Date of Patent: Aug. 15, 2006

(54) SWITCHING POWER SUPPLY UNIT AND ELECTRONIC APPARATUS HAVING DISPLAY

(75) Inventors: Taichi Hoshino, Kyoto (JP); Ryouma Matsuo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/967,702

(22) Filed: Oct. 6, 2004

(65) Prior Publication Data

US 2005/0127883 A1   Jun. 16, 2005

(30) Foreign Application Priority Data

Oct. 9, 2003   (JP) ............................. 2003-350246

(51) Int. Cl.
*G05F 1/656* (2006.01)

(52) U.S. Cl. ..................................... 323/222; 323/224

(58) Field of Classification Search ................ 323/222, 323/274, 224, 282, 225
See application file for complete search history.

(56) References Cited

U.S. PATENT DOCUMENTS 4,792,887 A * 12/1988 Bernitz et al. ................ 363/89
6,677,734 B1 * 1/2004 Rothleitner et al. ........ 323/259
6,756,771 B1 * 6/2004 Ball et al. .................... 323/222
6,936,997 B1 * 8/2005 Mullett ....................... 323/222

FOREIGN PATENT DOCUMENTS

| JP | 63-167668 | 7/1988 |
|----|-----------|--------|
| JP | 07-050983 | 2/1995 |
| JP | 11-150875 | 6/1999 |
| JP | 2001-037215 | 2/2001 |
| JP | 2003-224968 | 8/2003 |

* cited by examiner

Primary Examiner—Bao Q. Vu
(74) Attorney, Agent, or Firm—Hogan & Hartson LLP

(57) ABSTRACT

A switching power supply unit for providing an output voltage that is controlled such that a first detection voltage detected on the basis of the output voltage becomes equal to a first reference voltage. The peak voltage at the node of a serially connected coil and a switch of the switching power supply unit is detected and used as a second detection voltage for over-voltage protection. Thus, over-voltage protection of the switching power supply unit is secured with no additional terminal on the switching control IC for over-voltage protection even if such components as a feedback circuit and a rectifying diode of the power supply unit become open.

19 Claims, 6 Drawing Sheets

SWITCHING POWER SUPPLY UNIT AND ELECTRONIC APPARATUS HAVING DISPLAY

FIELD OF THE INVENTION

The invention relates to a switching power supply unit having an over-voltage protection function, and to an electronic apparatus having a display utilizing such power supply unit.

BACKGROUND OF THE INVENTION

There have been widely used switching power supply units having a coil and a switching element for stepping up an input voltage to a predetermined high output voltage.

Such switching power supply unit has a voltage detection circuit for feeding back the output voltage as a feedback voltage to be compared with a reference voltage. Based on the comparison, the duty ratio and the frequency of the switching element are controlled so as to regulate the output voltage to a desired level. As a backup of the voltage control, the switching power supply unit is provided with an over-voltage protection circuit utilizing the voltage detection circuit to monitor the output voltage such that, should the detected voltage exceeds a predetermined allowable limit, the over-voltage protection circuit execute a protective measure (see for example, Japanese Patent Publication of Examined Application No. H7-50983).

However, such conventional switching power supply unit has a drawback in that the feed back voltage falls to zero when the voltage detection circuit suffers an open-circuit malfunction for some reason, feeding back no voltage. Then a switching-control circuit controlling the switching of the power supply unit makes a determination that the output voltage is insufficient, and acts to raise the output voltage. As a consequence, the output voltage rises towards the maximum allowable level of the switching power supply unit.

Although the output voltage is monitored, such run away of the output voltage happens because the voltage detection circuit for feedback control of the output voltage cannot detect an over-voltage caused by such open-circuit malfunction of the voltage detection circuit.

To circumvent this drawback, an additional voltage detection circuit for detecting an over-voltage may be provided in addition to the voltage detection circuit for feeding back the output voltage. In this case, however, it is necessary to provide an additional terminal for the additional circuit on the control IC for controlling the switching of the power supply unit (the IC referred to as switching control IC). Provision of such additional terminal, however, entails a disadvantage that the switching control IC cannot be fully miniaturized.

A further disadvantage is that an over-voltage condition due to an open-circuit malfunction of a constituent element of the switching power supply unit or breaking of a wire in the unit cannot be detected by a conventional over-voltage detection circuit. Therefore, in that event also the over-voltage can be impressed on various components of the power supply unit, including the switches of the switching control IC and other components.

SUMMARY OF THE INVENTION

It is therefore an object of the invention to provide a switching power supply unit having over-voltage protection functionality, characterized in that the switching power supply unit can not only protect its switching control IC against an over-voltage without any new terminal, but also, unlike conventional switching power supply units, prevent over-voltage conditions under connection failure of components.

It is another object of the invention to provide an electronic apparatus having a display equipped with the inventive switching power supply unit having the over-voltage protection functionality as described above.

In accordance with one aspect of the invention, there is provided a switching power supply unit comprising:
a coil;
a switching means connected in series with the coil and adapted to be switched by a switching signal;
a rectifying and smoothing circuit for rectifying and smoothing the voltage appearing at the node (referred to as serial connection node) of the coil and the switching means to provide an output voltage;
a control circuit, receiving a first detection voltage associated with the output voltage and a first reference voltage, for controlling the output voltage so as to equilibrate the first detection voltage to the first reference voltage; and
an over-voltage protection circuit for generating an over-voltage protection signal for stopping the operation of the control circuit, the over-voltage protection circuit adapted to detect a second detection voltage associated with the voltage at the serial connection node, compare the second detection voltage with the second reference voltage, and generate the over-voltage protection signal when the second detection voltage exceeds the second reference voltage.

The switching means, control circuit, and over-voltage protection circuit of the switching power supply unit may be provided on a switching control IC of the unit.

The over-voltage protection circuit may have a peak detection circuit receiving the voltage at the serial connection node to generate the second detection voltage in accord with the peak voltage of the voltage at the serial connection node.

The over-voltage protection circuit may have a comparator for comparing the second detection voltage received from the peak detection circuit with the second reference voltage, and a latch circuit for generating the over-voltage protection signal in response to the output of the comparator.

The switching power supply unit may have a resistive voltage divider circuit consisting of resistors (referred to as voltage detection resistors) for dividing the output voltage of the switching power supply unit to generate the first detection voltage in the resistive voltage divider circuit.

The switching power supply unit may have a series circuit consisting of a display means and a voltage detection resistor, the series circuit impressed with the output voltage to generate the first detection voltage across the voltage detection circuit.

The switching power supply unit may have;
a primary series circuit consisting of a primary display means, a primary transistor serving as a mirror current source, and a primary voltage detection resistor, all connected in series in the order mentioned, the primary series circuit impressed with the output voltage; and
at least one secondary series circuit consisting of a secondary display means, a secondary transistor controlled by the mirror voltage of the primary transistor, and a secondary voltage detection resistor, all connected in series in the order mentioned, the secondary series circuit impressed with the output voltage, wherein
the voltage drop across the primary voltage detection resistor is provided as the first detection voltage.

Each of the display means and the primary and secondary display means may include at least one light emitting diode.

The first reference voltage may be regulated by a brightness control signal.

In accordance with another aspect of the invention, there is provided an electronic apparatus comprising:

a display having at least one display element; and a switching power supply unit having a coil, a switching means connected in series with the coil, the switching means switchable by a switching signal, a rectifying and smoothing circuit for rectifying and smoothing the voltage at the serial connection node of the coil and the switching means to provide an output voltage, a voltage detection circuit having voltage dropping means connected in series with said at least one display element to form a series circuitry that is impressed with the output voltage to generate a first detection voltage across the voltage dropping means, a control circuit, receiving the first detection voltage and a first reference voltage, for controlling the output voltage so as to equilibrate the first detection voltage to the first reference voltage; and an over-voltage protection circuit for generating an over-voltage protection signal for stopping the operation of the control circuit, the over-voltage protection circuit adapted to detect a second detection voltage associated with the voltage at the serial connection node, compare the second detection voltage with the second reference voltage, and generate the over-voltage protection signal when the second detection voltage exceeds the second reference voltage.

The display element may be a light emitting diode (LED).

The over-voltage protection circuit may have a peak detection circuit receiving the voltage at the serial connection node to generate the second detection voltage in accord with the peak voltage at the voltage at the serial connection node.

In the inventive switching power supply unit having an over-voltage protection function, the peak voltage appearing at the serial connection node of the coil and the switching means of the unit may be utilized as a second detection voltage for the over-voltage protection function. Thus, the switching control IC can provide over-voltage protection without any new terminal and irrespective of the location of connection failure of any component of the switching power supply unit.

The first detection voltage for the voltage control may be obtained by supplying the output voltage to the series connection of the load (display element such as an LED) and a voltage dropping means such as a resistor, and by extracting the voltage drop in the voltage dropping means. This enables provision of a predetermined level of current to the load.

The peak voltage that appears at the node of the series connection of the coil and the switching means of the switching power supply unit may be utilized as the second detection voltage for over-voltage protection of the power supply unit. Thus, over-voltage protection is secured for the switching power supply unit, irrespective of the location of connection failure in the unit, without adding new terminals for the over-voltage protection of the switching control IC.

DETAILED DESCRIPTION OF THE PREFERRED EMBODIMENT

Figure 1:
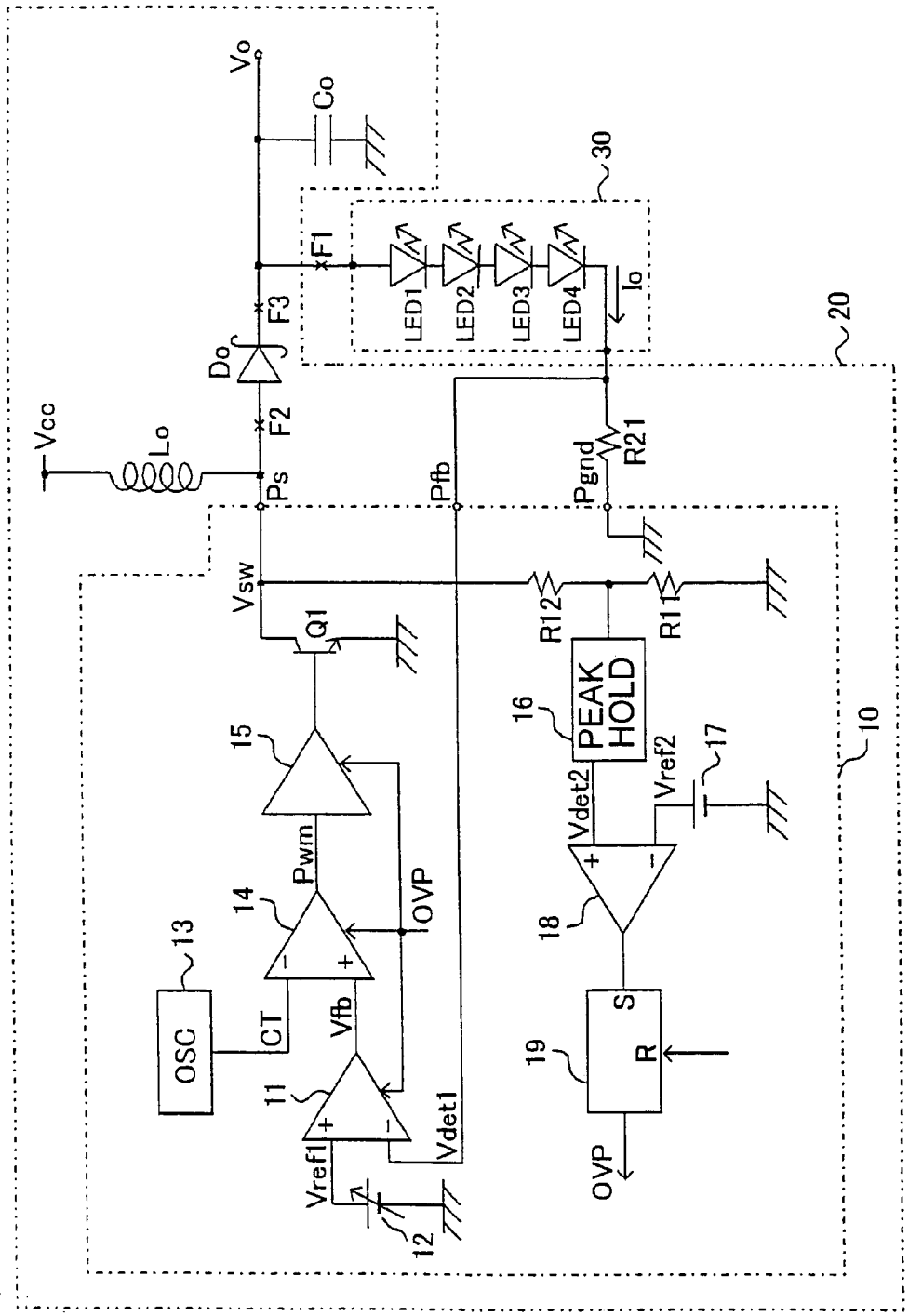
FIG. 1 is a block diagram representation of an electronic apparatus having a display equipped with a switching power supply unit in accordance with a first embodiment of the invention.
Figure 2:
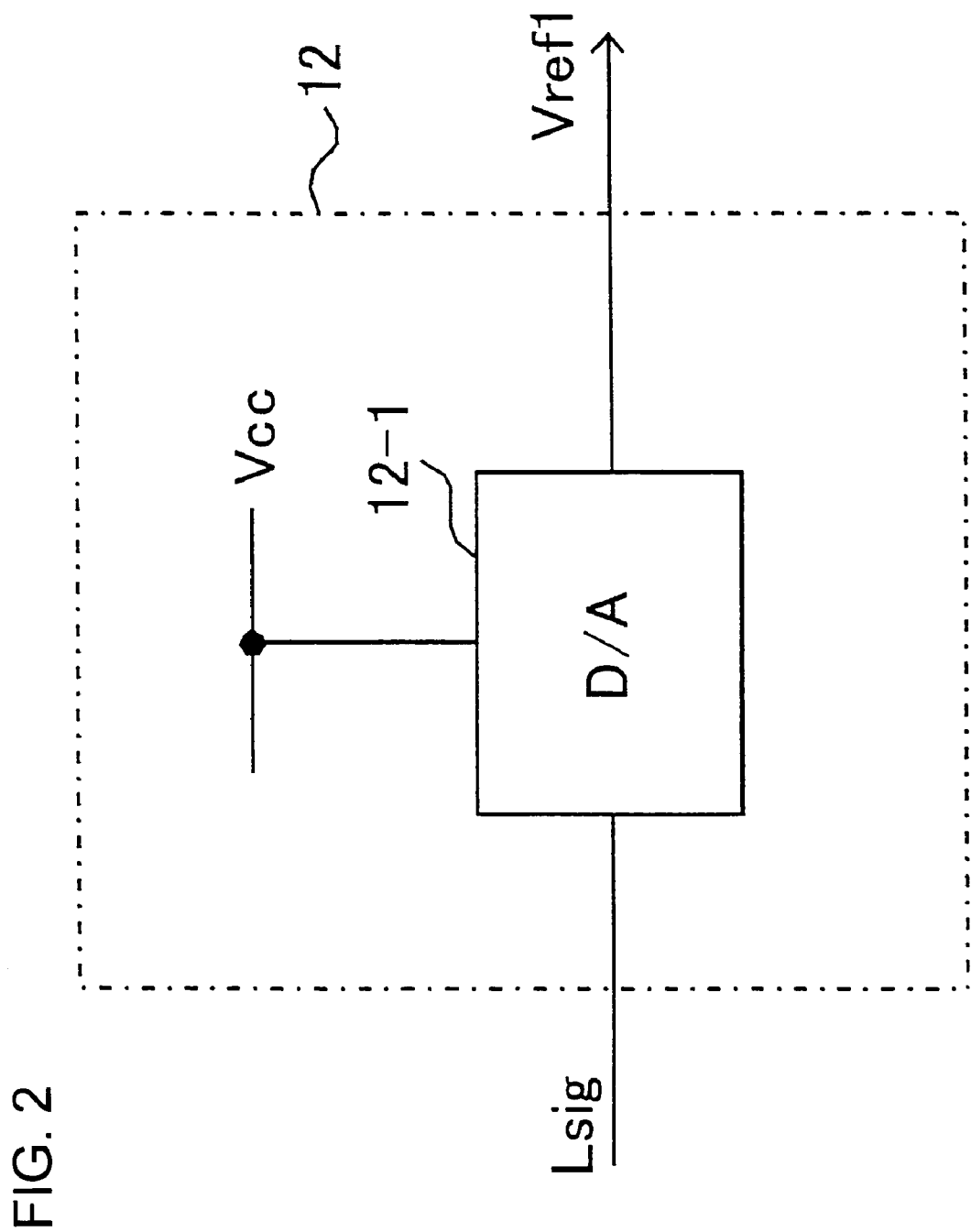
FIG. 2 is a block diagram representation of an exemplary reference voltage generation circuit.
Figure 3:
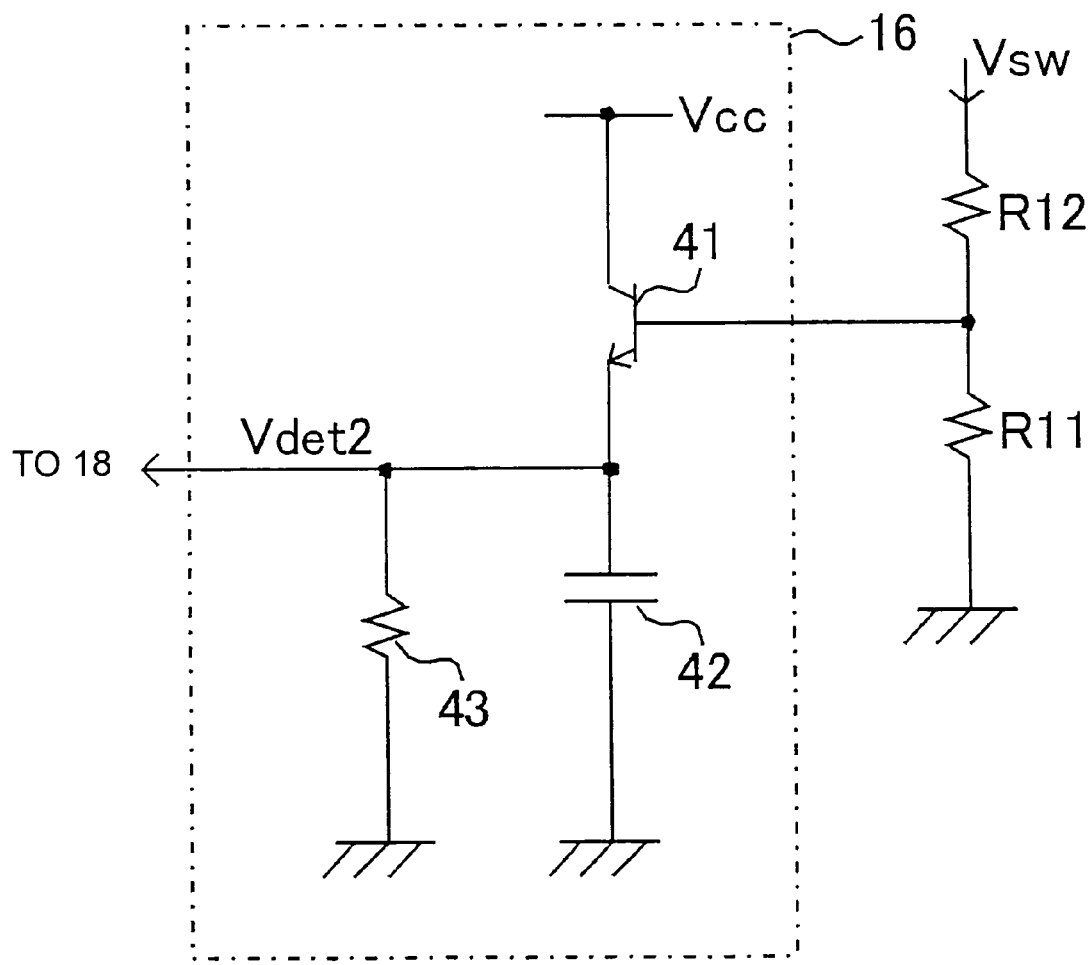
FIG. 3 is a circuit diagram of an exemplary peak hold circuit for use in detecting an over-voltage.
Figure 4:
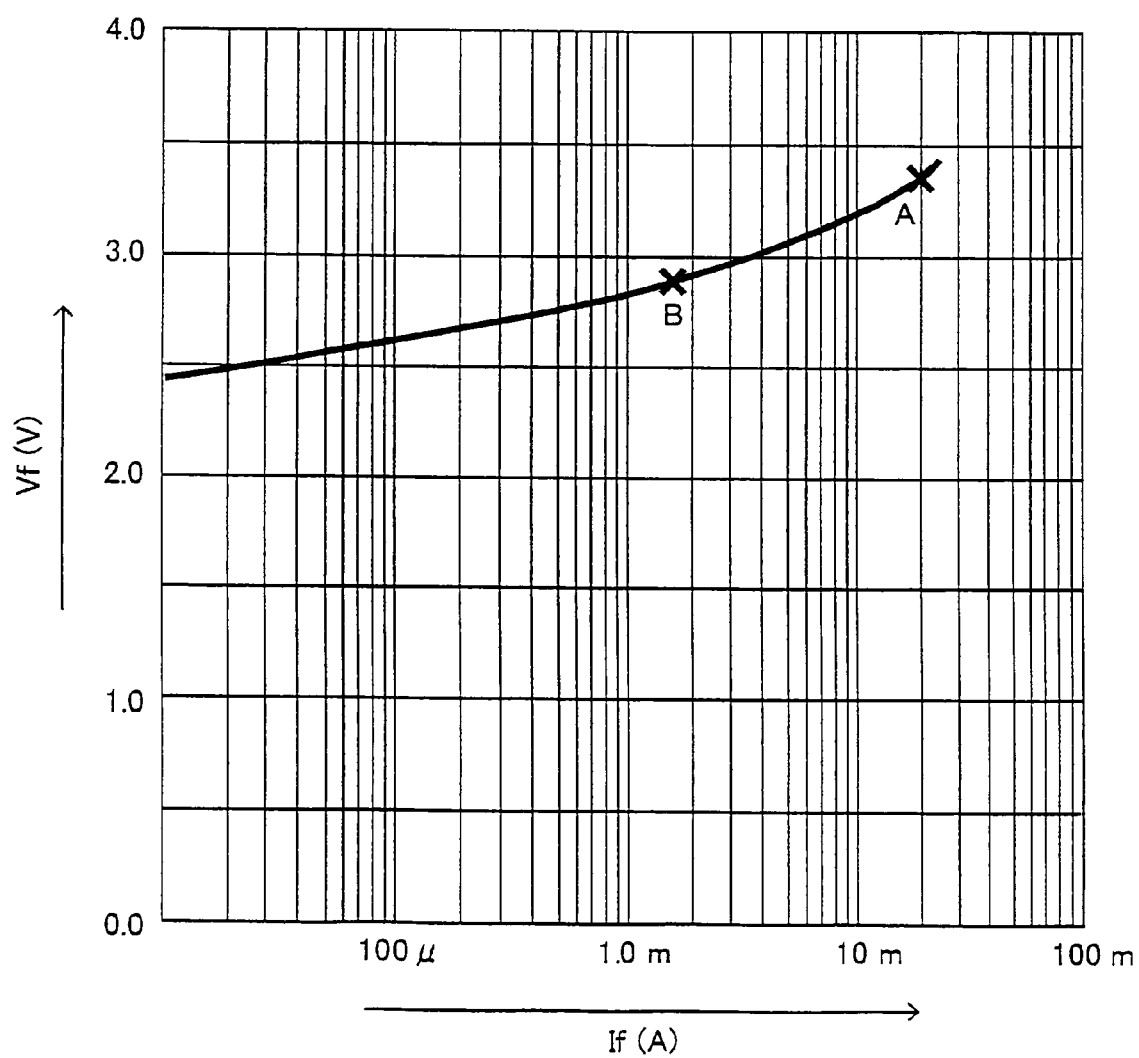
FIG. 4 is a graph showing the current-voltage characteristic of an exemplary LED.

The invention will now be described in detail by way of example with reference to the accompanying drawings. Referring to FIG. 1, there is shown an electronic apparatus having a display equipped with a switching power supply unit 20 according to a first embodiment of the invention. FIG. 2 shows the structure of an exemplary reference voltage generation circuit 12 for use in the switching power supply unit 20 of FIG. 1. FIG. 3 shows an exemplary peak hold circuit 16 for detecting an over-voltage. FIG. 4 shows a typical current-voltage characteristic of an LED constituting a load.

As shown in FIG. 1, the switching power supply unit 20 is a step-up type power supply unit configured to step-up an inputted power source voltage Vcc (which is 3.6 V for example) to a required output voltage Vo. The switching power supply unit 20 has an IC 10 for controlling the switching operation of the unit 20 (the IC referred to as switching control IC 10) for controlling the output voltage Vo. The display 30 is a load connected to the switching power supply unit 20. In the example shown, the display 30 includes serially connected display elements LEDs LED1–LED4 backlighting a liquid crystal display panel. In the example shown in FIG. 1, the display 30 is shown to be a series connection of four LEDs. However, it may be more or less than four LEDs connected possibly in different configurations (e.g. a series, a parallel, and a combination of series and parallel connection(s)) as needed, depending on the area to be illuminated and brightness of the area. In constructing an electronic apparatus having a display 30, the LEDs LED1–LED4 may be integrated into the switching power supply unit 20.

A coil Lo and a switch Q1 in the form of an NPN type bipolar transistor (referred to as NPN transistor) is connected in series between the power source voltage Vcc and the ground. A serial connection node Ps where the coil Lo is connected to the switch Q1, serves as a switch terminal Ps. The voltage Vsw appearing at the switch terminal Ps is supplied to a rectifying diode Do and a smoothing capacitor Co for rectifying and smoothing the voltage before it is provided as the output voltage Vo. The switch Q1 may be either a bipolar transistor of another type or a MOS transistor. The rectifying diode Do is preferably a Schottky barrier diode that exhibits a small voltage drop in the forward direction. In what follows the ground potential will be taken as the reference of voltages unless otherwise stated.

Connected between the output voltage Vo and the ground is a series connection of the display 30, and a voltage detection means in the form of a resistor R21. The LEDs LED1–LED4 of the display 30 are loads whose operating points are determined by the magnitude of the drive current Io flowing through them. In the example shown herein, drive current Io has a predetermined magnitude. The voltage drop across the voltage detection resistor R21 serves as a first detection voltage Vdet1. The first detection voltage Vdet1 is supplied to the IC 10 via a feedback terminal Pfb of the IC 10. The IC 10 is provided with a ground terminal Pgnd.

The coil Lo, rectifying diode Do, smoothing capacitor Co, and voltage detection resistor 21 are provided on the substrate of the switching power supply unit 20, along with the IC 10. The switching power supply unit 20 and display 30 may be incorporated in an electronic apparatus such as a cellular phone.

The first detection voltage Vdet1 and the first reference voltage Vref1 generated by a first reference voltage generation circuit 12 are supplied to an error amplifier 11 of the IC 10 to generate an error voltage Vfb in accord with the difference between the two input voltages.

As shown in FIG. 2, the first reference voltage generation circuit 12 has a digital-to-analog (D/A) converter circuit 12-1 for generating the first reference voltage Vref1 in accord with a digital brightness control signal Lsig. By regulating the brightness control signal Lsig, the first detection voltage Vdet1, and hence the driving current Io flowing through the LEDs LED1–LED4, can be varied. Brightness of the display 30 is controlled by regulating the amount of light emitted by the LEDs LED1–LED4.

The oscillator 13 generates a triangular wave signal (saw-tooth wave signal) CT to perform pulse width modulation (PWM) of the switching control IC. The frequency of the triangular wave signal CT can be as high as 1.3 MHz for example. A PWM comparator 14 compares the triangular wave signal CT with the error voltage Vfb. The PWM comparator 14 generates a pulse width modulation signal Pwm whose duty ratio increases with the error voltage Vfb.

The pulse width modulation signal Pwm is supplied as the switching control signal to the switch Q1 via a pre-driver 15.

In the IC 10, a second detection voltage Vdet2 associated with the peak level of the voltage Vsw at the serial connection node Ps is detected by a peak detection circuit consisting of voltage diving resistors R11 and R12 and a peak hold circuit 16.

The peak hold circuit 16 is formed of an NPN transistor 41, a capacitor 42, and a resistor 43 all connected in series between the power source voltage Vcc and the ground, with the base of the NPN transistor 41 supplied with the voltage divided by the voltage dividing resistors R11 and R12, as shown in FIG. 3. The charge voltage of the capacitor 42 is outputted as the second detection voltage Vdet2.

A voltage comparator 18 compares a second reference voltage Vref2 generated by a second reference voltage generation circuit 17 with the second detection voltage Vdet2 to generate a comparison output when the second detection voltage Vdet2 exceeds the second reference voltage Vref2. The comparison output is supplied as a setting signal to a latch circuit 19.

Upon receipt of this setting signal at a setting terminal S, the latch circuit 19 is activated to generate an over-voltage protection signal OVP. The over-voltage protection signal OVP stops the step-up operation of the power supply unit 20. Specifically, in the example shown herein, the over-voltage protection signal OVP stops the error amplifier 11, PWM comparator 14, and pre-driver 15, which leads to stopping of the step-up operation. Of course, the invention is not limited to this example. The latch circuit 19 is reset and stops its latching condition upon receipt of a reset signal at the reset terminal R thereof, and stops generating the over-voltage protection signal OVP.

Referring to FIG. 4, there is shown a characteristic If–Vf curve of a white LED constituting the LEDs LED1–LED4, where If is current flowing through the white diode and Vf is the voltage applied to the white diode. In FIG. 4, the abscissa indicates logarithmic current If and the coordinate indicate voltage Vf. This LED emits light when current If is in the range from 20 mA (Point A) to 1.5 mA (point B). The amount of light emitted by the LED varies in accord with the magnitude of current If.

As seen in FIG. 4, in the operating range of current If from 1.5 mA to 20 mA, voltage Vf of the LED varies from about 2.8 V (point A) to about 3.4 V (point B). However, since If–Vf characteristics of the respective LEDs are not all the same even under the same drive current If, operating voltages of the LEDs can vary in the range from 3.4 V to 4.0 V for example.

As a consequence, the output voltage Vo can vary in the range from 11 V to 16 V for example in accordance with the amount of light emitted from the LED LED1–LED4. In view of the fact that the output voltage Vo can vary in the range as stated above, the over-voltage protection signal OVP is generated preferably when the output voltage Vo has reached a preset level of, for example, 30 V.

Operation of the switching power supply unit in accordance with the first embodiment of the invention will now be described below.

First, the level of the first reference voltage Vref1 is determined for a required drive current Io (20 mA for example) to be passed through the LEDs LED1–LED4 of the display 30. The level of the first reference voltage Vref1 is set such that it equals the product of Io and the resistance of the voltage detection resistor R21. The level of the second reference voltage Vref2 is set such that the second reference voltage Vref2 equals the voltage obtained by dividing the voltage Vsw appearing at the switch terminal Ps (serial connection node Ps) by the voltage dividing resistors R1 and R2 when Vsw is 30 V.

PWM control of the switching power supply unit 20 is started by the error amplifier 11, oscillator 13, PWM comparator 14, and pre-driver 15 when the power source voltage Vcc is supplied to the unit 20 and IC 10, switching on and off the switch Q1 by a pulse width modulation signal Pwm. As a result, the voltage Vsw at the switch terminal Ps is rectified and smoothed by the rectifying diode Do and smoothing capacitor Co, respectively, allowing the output voltage Vo to gradually increase. As the output voltage Vo increases, the drive current Io flowing through the LEDs LED1–LED4 increases, up to a predetermined level (20 mA in the example shown herein). When the drive current reaches the predetermined level, the first detection voltage Vdet1 becomes substantially equal to the first reference voltage Vref1, which is the anticipated steady-state level of the drive current Io. The LEDs LED1–LED4 emit predetermined amount of light under such stable normal operating condition.

If the display 30 is not properly connected to the switching power supply unit 20, or a lead wire between them is broken at a certain point F1 (referred to as point of malfunction) as shown in FIG. 1, then an open-circuit condition or open-circuit malfunction takes place at that point F1. In this case, the drive current Io will not flow through the LEDs, though the PWM control has been started, so that the LEDs will not emit light and the first detection voltage Vdet1 remains zero. As a consequence, the error voltage Vfb remains high, and the switch Q1 further operates to raise the output voltage Vo. As a result, the output voltage Vo tends to rise up to its upper limit.

In this case, if, as in conventional switching power supply units, over-voltage protection is also based on the feedback voltage across the voltage detection resistor R21 for monitoring of the output voltage, the open-circuit malfunction occurring at point F1 cannot be detected, resulting in over-voltage protection failure. If an additional voltage detection circuit is provided for over-voltage protection independently of the voltage detection circuit (i.e. the feedback loop for providing a controlled output voltage), a further terminal for the additional over-voltage protection circuit must be provided to the switching control IC.

It should be appreciated that the invention allows monitoring over-voltage condition caused by an open-circuit malfunction taking place at a point of malfunction F1 for example by checking the voltage Vsw appearing at the switch terminal Ps. The voltage Vsw turns out to be the output voltage Vo plus the voltage drop Vf across the rectifying diode Do in the forward direction when the switch Q1 is turned off, while it becomes substantially zero when the switch Q1 is turned on. Thus, the voltage Vsw assumes to be a high frequency pulse train having a frequency (about 1.3 MHz in the example shown) determined by the pulse width modulation signal Pwm.

The peak hold circuit 16 holds the peak level of the voltage obtained by dividing the voltage Vsw by the voltage dividing resistors R11 and R12, and provides the second detection voltage Vdet2 indicative of the peak level. As the over-voltage reaches a predetermined level (e.g. 30 V), the second detection voltage Vdet2 exceeds the second reference voltage Vref2. Then the voltage comparator 18 is put in operation to generate an over-voltage protection signal OVP from the latch circuit 19. This causes the switch Q1 to stop, as a consequence of over-voltage protection.

This over-voltage protection mechanism works well against an open-circuit malfunction that takes place at some point, e.g. F1, not only when the output voltage Vo is in gradual rise after the startup of the PWM control but also when the output voltage Vo has reached the nominal operating level.

It should be appreciated that the over-voltage protection can be attained without providing the IC with a new terminal for the protection.

It should be also appreciated that the over-voltage protection can be afforded against connection failure due to, for example poor connection and/or disconnection at point F2 on the anode side or at point F3 on the cathode side of the rectifying diode Do.

In a event that malfunction takes place at point F2 or F3, a high over-voltage (60 V for example) will appear at the switch terminal Ps due to the energy stored in the coil Lo when the switch Q1 is turned off since the voltage Vsw at the switch terminal does not depend on the output voltage Vo. But the voltage Vsw goes down to zero when the switch Q1 is turned on. As a consequence, the voltage Vsw appears to be a high-frequency pulse train (of 1.3 MHz for example), pulled up and down by the PWM signal Pwm.

In this case also, the peak level of the voltage Vsw is detected and used as the second detection voltage Vdet2. When the second detection voltage Vdet2 exceeds the second reference voltage Vref2, the voltage comparator 18 is activated to cause the latch circuit 19 to generate an over-voltage protection signal OVP. Thus, the switch Q1 is stopped to carry out the over-voltage protection. Since the over-voltage protection signal OVP is issued in a very short time (e.g. 100 microseconds) following the occurrence of an open-circuit malfunction, there is no problem in protecting the IC 10 from the over-voltage. If needed, however, voltage limiting elements (such as Zener diodes) may be connected to the switch terminal Ps to limit the voltage Vsw.

As described above, in the inventive switching power supply unit 20, the voltage Vsw appearing at the switch terminal Ps connecting the coil (serial connection node) Lo with the switch Q1 is utilized as the second detection voltage Vdet for over-voltage protection. Thus, over-voltage protection is afforded in the event that some constituent element such as the rectifying diode Do of the switching power supply unit 20 has become open or some internal line has come down in the unit. It should be appreciated that the over-voltage protection can be secured irrespective of the locations of malfunction F1–F3 without forming a new terminal for the protection on the switching control IC 10.

Figure 5:
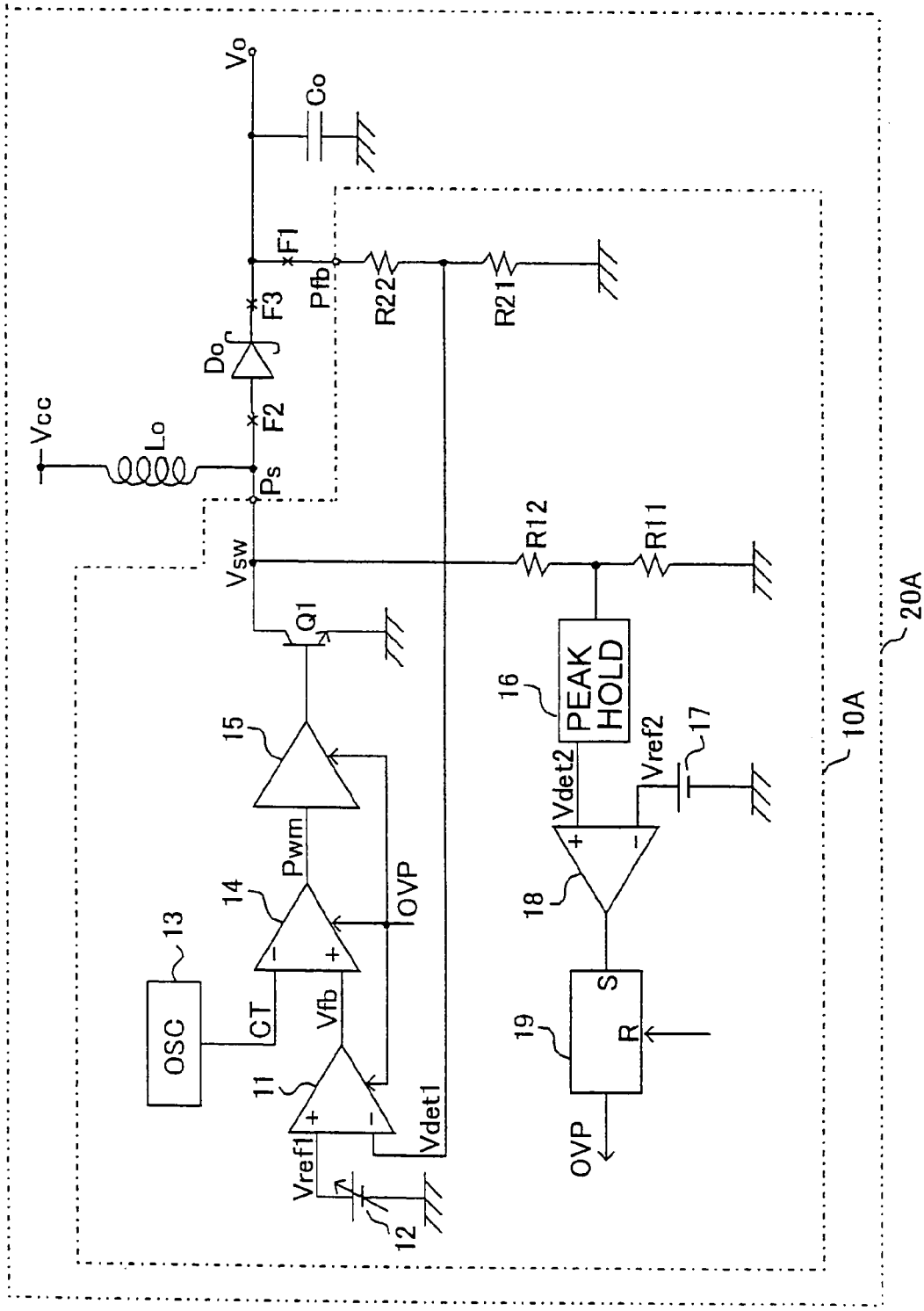
FIG. 5 is a block diagram representation of a switching power supply unit in accordance with a second embodiment of the invention.

Referring to FIG. 5, there is shown a switching power supply unit 20A in accordance with a second embodiment of the invention, in which a voltage detection resistor R22 is provided in the switching IC 10A, substituting for the load of FIG. 1, i.e. display 30. The voltage detection resistor R22, together with the voltage detection resistor R21, divides the output voltage Vo to generate the first detection voltage Vdet1. The rest of the structure of the switching power supply unit 20A is the same as that of the unit 20 shown in FIG. 1.

In the inventive switching power supply unit 20A, the output voltage Vo is provided at a predetermined level in accord with the first reference voltage Vref1 set up by the first reference voltage generation circuit 12. Thus, the switching power supply unit 20A works as a constant voltage power supply unit.

Regarding open-circuit malfunctions that take place at points of malfunction, e.g. points F1 and F2, the switching power supply unit 20A of FIG. 5 provides secure protection similar to that of FIG. 1.

Figure 6:
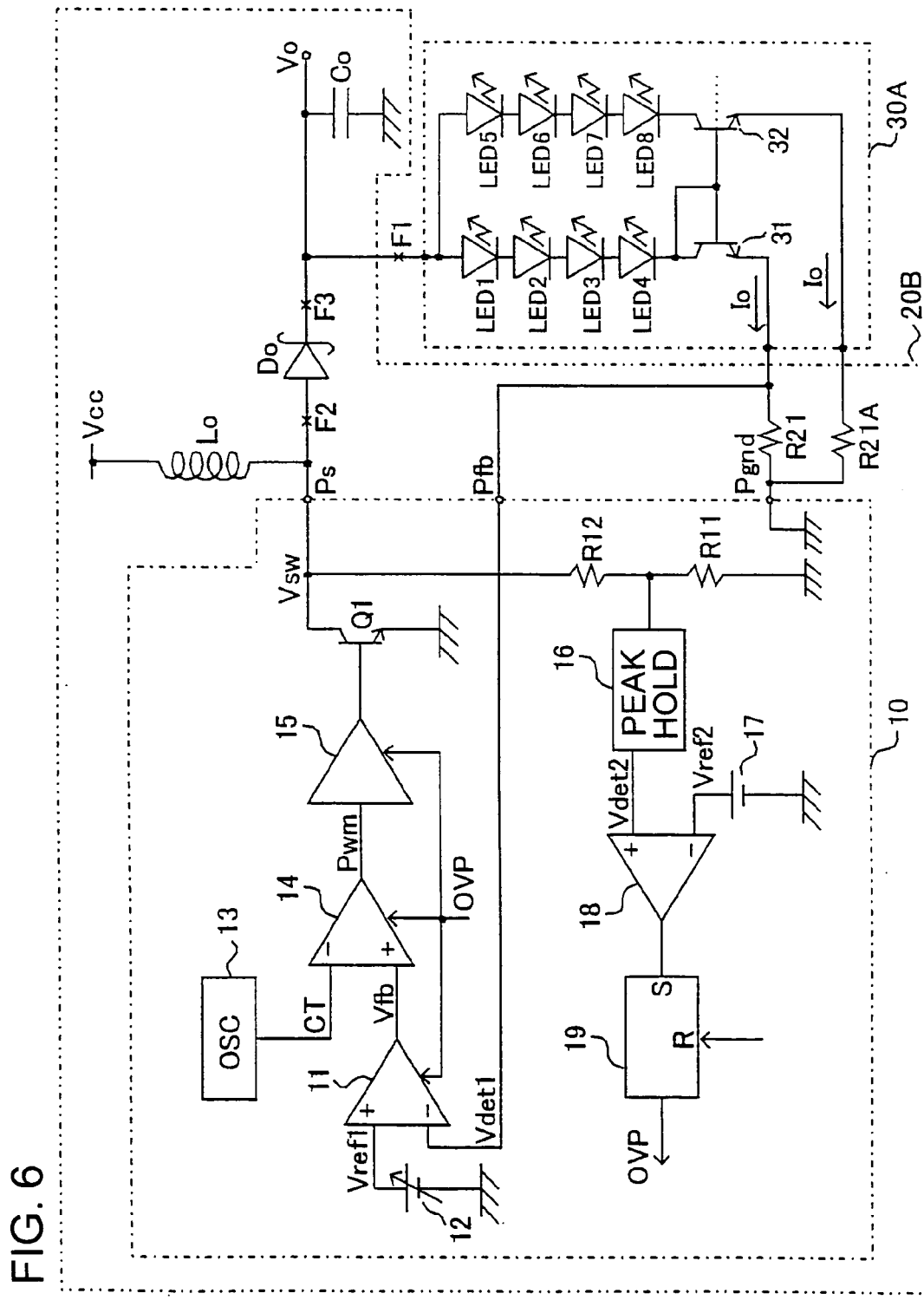
FIG. 6 is a block diagram representation of an electronic apparatus having a display equipped with a switching power supply unit in accordance with a third embodiment of the invention.

Referring to FIG. 6, there is shown a switching power supply unit in accordance with a third embodiment of the invention and an electronic apparatus having a display 30A that utilizes the unit. The third embodiment is an example in which the display 30A includes a multiplicity of LEDs as display elements (eight elements in this example).

As seen in FIG. 6, the display 30A has a primary display means (LED1–LED4) connected in series with an NPN transistor 31 having a collector and a base coupled together, and a secondary display means (LED5–LED8) connected in series with another NPN transistor 32. The bases of the NPN transistors 31 and 32 are connected each other to form a current mirror configuration. The emitter of the NPN transistor 31 is connected to a voltage detection resistor R21, and the emitter of the NPN transistor 32 is similarly connected to a voltage detection resistor R21A. The NPN transistor 31 is the primary transistor, or mirror current source, of the current mirror configuration, while the NPN transistor 32 is the secondary transistor, or mirrored current source, that is controlled by the mirror voltage received from the primary transistor.

In the example shown in FIG. 6, the output voltage Vo is controlled so that the voltage drop across the voltage detection resistor R21, i.e. the first detection voltage Vdet1, becomes equal to the first reference voltage Vref1. As a result, a predetermined drive current Io flows through the LEDs LED1–LED4 and the NPN transistor 31. Since the NPN transistors 31 and 32 are connected in the current mirror configuration as described above, the same drive current Io flows through each of the LEDs LED5–LED8 and the NPN transistor 32, provided that the voltage detection resistors R21A and R21 have the same resistance. Thus LEDs LED1–LED4 and LEDs LED5–LED8 emit the same amount of light.

In this way, many LEDs LED1–LED8 may be provided in groups in the display 30A without being limited by the maximum allowable limit of the output voltage Vo of the switching power supply unit 20B and controlled so that each group emits the same amount of light.

On the other hand, the current mirror ratio between the NPN transistors 31 and 32 as well as the resistance ratio between the voltage detection resistors R21 and R21A can be varied arbitrarily. Then the ratio between the currents flowing through the respective groups of LEDs (LED1–LED4 and the LED5–LED8) can be altered arbitrarily. Thus, amounts of light emitted by the respective groups can be controlled to a predetermined ratio as needed.

It will be apparent to a person skilled in the art that a further group of LEDs can be added to the existing groups and the brightness of the added LEDs can be controlled in the same manner by setting up a further current mirror circuit similar to that for the LEDs LED5–8 and NPN transistor 32.

It will be also apparent that although the groups of LEDs (LED1–LED4 and LED5–LED8) have the same number of LEDs in the example shown herein, the respective groups may have different numbers of LEDs as needed.

The inventive switching power supply unit and the electronic apparatus having a display that utilizes the switching power supply unit as shown in FIG. 6 operate in the same manner as those of FIG. 1, with similar over-voltage protection capability against connection failures including open-circuit malfunctions at points F1 and F2.

We claim:

1. A switching power supply unit comprising:
   a coil;
   a switching means connected in series with said coil and switched by a switching signal;
   a rectifying and smoothing circuit for rectifying and smoothing the voltage (referred to as voltage at the serial connection node) at the node of said coil and said switching means to provide an output voltage;
   a control circuit, receiving a first detection voltage associated with said output voltage and a first reference voltage, for controlling said output voltage by equilibrating said first detection voltage with said first reference voltage; and
   an over-voltage protection circuit for generating an over-voltage protection signal for stopping the operation of said control circuit, said over-voltage protection circuit adapted to detect a second detection voltage associated with said voltage at the serial connection node, compare said second detection voltage with said second reference voltage, and generate said over-voltage protection signal when said second detection voltage exceeds said second reference voltage.

2. The switching power supply unit according to claim 1, wherein said switching means, control circuit, and over-voltage protection circuit are provided on a switching control IC of the switching power supply unit.

3. The switching power supply unit according to claim 2, further comprising a series circuit consisting of a display means and a voltage detection resistor, said series circuit impressed with said output voltage to generate said first detection voltage across said voltage detection resistor.

4. The switching power supply unit according to claim 2, further comprising:
   a primary series circuit consisting of a primary display means, a primary transistor serving as a mirror current source, and a primary voltage detection resistor, all connected in series in the order mentioned, said primary series circuit impressed with said output voltage; and
   at least one secondary series circuit consisting of a secondary display means, a secondary transistor controlled by the mirror voltage of said primary transistor, and a secondary voltage detection resistor, all connected in series in the order mentioned, said secondary series circuit impressed with said output voltage, wherein
   the voltage drop across said primary voltage detection resistor is provided as said first detection voltage.

5. The switching power supply unit according to claim 1, wherein said over-voltage protection circuit has a peak detection circuit receiving said voltage at the serial connection node to generate said second detection voltage in accord with the peak voltage of said voltage at the serial connection node.

6. The switching power supply unit according to claim 5, wherein said over-voltage protection circuit has
   a comparator for comparing said second detection voltage received from said peak detection circuit with said second reference voltage, and
   a latch circuit for generating said over-voltage protection signal in response to the output of said comparator.

7. The switching power supply unit according to claim 6, further comprising a resistive voltage divider circuit consisting of resistors (referred to as voltage detection resistors) for dividing the output voltage of said switching power supply unit to generate said first detection voltage in said resistive voltage divider circuit.

8. The switching power supply unit according to claim 5, further comprising a series circuit consisting of a display means and a voltage detection resistor, said series circuit impressed with said output voltage to generate said first detection voltage across said voltage detection resistor.

9. The switching power supply unit according to claim 5, further comprising
   a primary series circuit consisting of a primary display means, a primary transistor serving as a mirror current source, and a primary voltage detection resistor, all connected in series in the order mentioned, said primary series circuit impressed with said output voltage; and
   at least one secondary series circuit consisting of a secondary display means, a secondary transistor controlled by the mirror voltage of said primary transistor, and a secondary voltage detection resistor, all connected in series in the order mentioned, said secondary series circuit impressed with said output voltage, wherein
   the voltage drop across said primary voltage detection resistor is provided as said first detection voltage.

10. The switching power supply unit according to claim 1, further comprising a series circuit consisting of a display means and a voltage detection resistor, said series circuit impressed with said output voltage to generate said first detection voltage across said voltage detection resistor.

11. The switching power supply unit according to claim 10, wherein said display means includes at least one light emitting diode.

12. The switching power supply unit according to claim 11, wherein said first reference voltage is regulated by a brightness control signal.

13. The switching power supply unit according to claim 1, further comprising:
- a primary series circuit consisting of a primary display means, a primary transistor serving as a mirror current source, and a primary voltage detection resistor, all connected in series in the order mentioned, said primary series circuit impressed with said output voltage; and
- at least one secondary series circuit consisting of a secondary display means, a secondary transistor controlled by the mirror voltage of said primary transistor, and a secondary voltage detection resistor, all connected in series in the order mentioned, said secondary series circuit impressed with said output voltage, wherein
the voltage drop across said primary voltage detection resistor is provided as said first detection voltage.

14. The switching power supply unit according to claim 13, wherein each of said primary and secondary display means includes at least one light emitting diode.

15. The switching power supply unit according to claim 14, wherein said first reference voltage is regulated by a brightness control signal.

16. An electronic apparatus comprising:
- a display having at least one display element; and
- a switching power supply unit having
  - a coil,
  - switching means connected in series with said coil, said switching means switchable by a switching signal,
  - a rectifying and smoothing circuit for rectifying and smoothing the voltage (referred to as voltage at the serial connection node) at the node of said coil and said switching means to provide an output voltage,
  - a voltage detection circuit having voltage dropping means connected in series with said at least one display element to form a series circuitry that is impressed with said output voltage to generate across said voltage dropping means a first detection voltage,
  - a control circuit, receiving said first detection voltage and a first reference voltage, for controlling said output voltage by equilibrating said first detection voltage with said first reference voltage; and
  - an over-voltage protection circuit for generating an over-voltage protection signal for stopping the operation of said control circuit, said over-voltage protection circuit adapted to detect a second detection voltage associated with said voltage at the serial connection node, compare said second detection voltage with said second reference voltage, and generate said over-voltage protection signal when said second detection voltage exceeds said second reference voltage.

17. The switching power supply unit according to claim 16, wherein said display element is a light emitting diode.

18. The switching power supply unit according to claim 17, further comprising a peak detection circuit receiving said voltage at the serial connection node to generate said second detection voltage in accord with the peak voltage of said voltage at the serial connection node.

19. The switching power supply unit according to claim 16, further comprising a peak detection circuit receiving said voltage at the serial connection node to generate said second detection voltage in accord with the peak voltage of said voltage at the serial connection node.

* * * * *